Patented Apr. 14, 1931

1,801,095

UNITED STATES PATENT OFFICE

ERNST IVAR LEVIN, OF STOCKHOLM, SWEDEN

METHOD OF PREPARING PRESERVABLE YEAST PREPARATIONS

No Drawing. Application filed May 12, 1927, Serial No. 190,968, and in Sweden May 26, 1926.

The present invention refers to a method of preparing a yeast preparation which will keep much better than ordinary yeast both as regards storing time and temperature variations.

It is known that the cells of fungi suitable for fermentative purposes of the species *ascomycetes* under suitable external conditions can form what is known as asco-spores, a concentration form of the protoplasm. It has further been scientifically shown that the formation of asco-spores is promoted if the yeast fungi are exposed to the effect of air and that it is the oxygen in the air which appears to have this promoting effect. These asco-spores are considerably firmer than the original cells and can be stored for a very long time without losing their capability of being converted into cells capable of fermentation and they are also able to stand comparatively large variations in the temperature. The spores can then be converted into cells capable of fermentation and development by the addition of nutriment and at a suitable temperature.

The invention refers to a method based on these known scientific facts of preparing a preservable yeast preparation. According to the invention an oxygen mixture is used instead of air for treating the yeast fungi in order to convert them into asco-spores. According to one way of carrying out the invention an oxygen mixture is used for this purpose, the oxygen contents of which are greater than that of the air, as for instance air which has been concentrated with regard to its oxygen contents or preferably pure oxygen. In this way the treatment becomes more effective and the time of treatment is reduced. According to another way of carrying out the invention the asco-spores obtained are treated in a suitable way so that remaining yeast fungi are destroyed.

The method is suitably carried out in the following manner: A pure culture is prepared in known manner from a species of yeast suitable for the purpose of the preparation or from a mixture of several of these. This pure culture is added to a sterile nutriment containing substances suitable for the propagation of the yeast. When the solution is in a state of vigorous yeast propagation, the yeast is separated, for instance, by centrifuging or filtering accompanied by pressing. The product obtained is subjected to such a temperature, for instance 54–55° C., for such a period, for instance ¼ to 3 hours, that cells not suitable for conversion into spores are weakened or destroyed as effectively as possible. The product is now spread in a thin layer on a suitable supporting material and then subjected to the effect of chemically pure oxygen which has been passed through an apparatus for the sterilization of the gas. During this operation the temperature of the mass is kept at about 30° C. and the treatment lasts for a sufficient period of time to allow as great a quantity of the cells as possible to be converted into spores. It has been found that a period of time of 20 to 40 hours is sufficient for this purpose. The product formed is now preferably subjected to a repeated heating to 50–60° C. for a period of time of for instance one to two hours, during which the remaining yeast fungi are destroyed. After the heat treatment the preparation is ready to be used and can be stored for a long time without detrimental effects. When the preparation is to be used for fermentative purposes, it is only necessary to add to it a suitable nutriment containing substances suitable for the propagation of the yeast cells, as for instance nitrogen or phosphorous compounds or similar substances.

In order to facilitate the treatment with the oxygen mixture, for instance pure oxygen, and to ensure a rapid conversion of the yeast cells into asco-spores, it is suitable, before or after the treatment with the said gas mixture, to mix the product in for instance a kneading machine with a sterile, dry substance. This substance should consist of matter indifferent to the spores.

It is of importance that no infection takes place during the treatment and for this reason every one of the additions, the gas used, all the apparatus, etc., should be carefully sterilized.

In order to obtain a preparation easily handled for baking purposes, it is suitable to mix the product with a dry sterile substance such as flour, for instance with 10 per cent of flour of wheat before the treatment with the oxygen mixture. In doing this it is of course necessary to ensure that all yeast fungi, not suitable for formation of spores, have been destroyed, before this addition is made. The product obtained after the final treatment is suitably mixed with a sterilized, dry, nutritive preparation, for instance sugar, in such proportion, that when using the yeast preparation with a calculated amount of water a nutritive liquid, suitable for the growth of the yeast cells, is obtained.

When the dry preparation thus obtained is to be used for baking, a suitable quantity thereof is dissolved in the lukewarm milk or water to be used in the dough, whereupon the dough, the yeast cells having been allowed to develop for a suitable period of time, is prepared, using this solution as dough liquid.

The yeast preparation according to the invention can of course be used not only for baking purposes but also for any other fermentative purpose, for instance in the manufacture of beer, wine, acetic acid or the like.

What I claim is:

1. The process of treating yeast fungi in a substantially dehydrated state which comprises subjecting them to the action of a gas containing oxygen, the oxygen content of which is greater than that of air to convert the yeast fungi into asco-spores, and thereafter subjecting the material to heat to destroy remaining yeast fungi unsuitable for conversion into spores.

2. The process of treating yeast fungi in a substantially dehydrated state which comprises subjecting them to the action of pure, sterile, oxygen to convert the yeast fungi into asco-spores, and thereafter subjecting the material to heat to destroy remaining yeast fungi unsuitable for conversion into spores.

3. The process of treating yeast fungi in a substantially dehydrated state which comprises heating the fungi to a temperature high enough to destroy fungi unsuitable for conversion into spores, then subjecting the fungi, at a spore-forming temperature, to the action of a gas containing oxygen, the oxygen content of which is greater than that of air.

4. The process of treating yeast fungi in a substantially dehydrated state which comprises heating the fungi to a temperature high enough to destroy fungi unsuitable for conversion into spores, then subjecting the fungi, at a spore-forming temperature, to the action of a sterile gas containing oxygen, the oxygen content of which is greater than that of air.

5. The process of treating yeast fungi in a substantially dehydrated state which comprises heating the fungi to a temperature high enough to destroy fungi unsuitable for conversion into spores, then subjecting the fungi, at a spore-forming temperature, to the action of pure sterile oxygen.

6. The process of treating yeast fungi which comprises subjecting the fungi in admixture with a dry sterile inert substance to the action of a gas containing oxygen, the oxygen content of which is greater than that of air, to convert the yeast fungi to asco-spores, and subjecting the asco-spores material obtained to heat to destroy any remaining yeast fungi unsuitable for conversion into spores.

7. The process of treating yeast fungi which comprises subjecting the fungi in admixture with a dry sterile inert substance to the action of pure sterile oxygen to convert the yeast fungi to asco-spores and subjecting the asco-spore material obtained to heat to destroy any remaining yeast fungi unsuitable for conversion into spores.

8. The process of treating yeast fungi which comprises heating the fungi to a temperature high enough to destroy fungi unsuitable for conversion into spores, admixing a dry inert sterile substance with the fungi, subjecting the mixture, at a spore-forming temperature, to the action of a gas containing oxygen, the oxygen content of which is greater than that of air.

9. The process of treating yeast fungi which comprises heating the fungi to a temperature high enough to destroy fungi unsuitable for conversion into spores, admixing a dry inert sterile substance with the fungi, subjecting the mixture, at a spore-forming temperature, to the action of pure, sterile oxygen.

In testimony whereof I affix my signature.

ERNST IVAR LEVIN.